United States Patent [19]

Barker et al.

[11] Patent Number: 4,900,957
[45] Date of Patent: Feb. 13, 1990

[54] FAN DRIVE WITH WATER SLINGER SEAL

[75] Inventors: Gerald N. Barker; Carl R. Fischer, both of St. Louis, Mo.

[73] Assignee: Emerson Electric Co., St. Louis, Mo.

[21] Appl. No.: 226,415

[22] Filed: Jul. 29, 1988

[51] Int. Cl.[4] .......................... H02K 9/06; H02K 5/00
[52] U.S. Cl. ........................................ 310/62; 310/88; 310/63
[58] Field of Search ................. 310/88, 157, 67 R, 62, 310/63

[56] References Cited

U.S. PATENT DOCUMENTS

| | | | |
|---|---|---|---|
| 4,535,262 | 8/1985 | Newberg | 310/88 |
| 4,689,507 | 8/1987 | Baker et al. | 310/58 |
| 4,689,511 | 8/1987 | Baker et al. | 310/157 |

Primary Examiner—Patrick R. Salce
Assistant Examiner—C. La Balle
Attorney, Agent, or Firm—Polster, Polster and Lucchesi

[57] ABSTRACT

A fan drive and water slinger seal for a vertically mounted electrical motor. A fan is placed on a motor shaft so opposing flats on the interior surface of the fan hub fan mater with corresponding flats on the shaft to prevent slippage between the fan and shaft during motor operation. The hub contains a spring like finger extending upward axially along a groove in the inner wall of the hub and engaging an annular groove on the shaft to prevent axial movement of the fan along the shaft. The fan is positioned between a motor endshield and an overlying drip pan which encircles the shaft and carries liquid away from the motor. A flexible slinger snugly and adheringly fits on the shaft and has an O-ring type interior seal for sealing within a second annular groove on the motor shaft. The outer peripheral edge of the slinger curves downward creating a peripheral, cylindrical lip which overhangs an upwardly extending lip about the periphery of the opening in the pan through which the motor shaft passes, the overhang preventing liquid from reaching the motor.

12 Claims, 2 Drawing Sheets

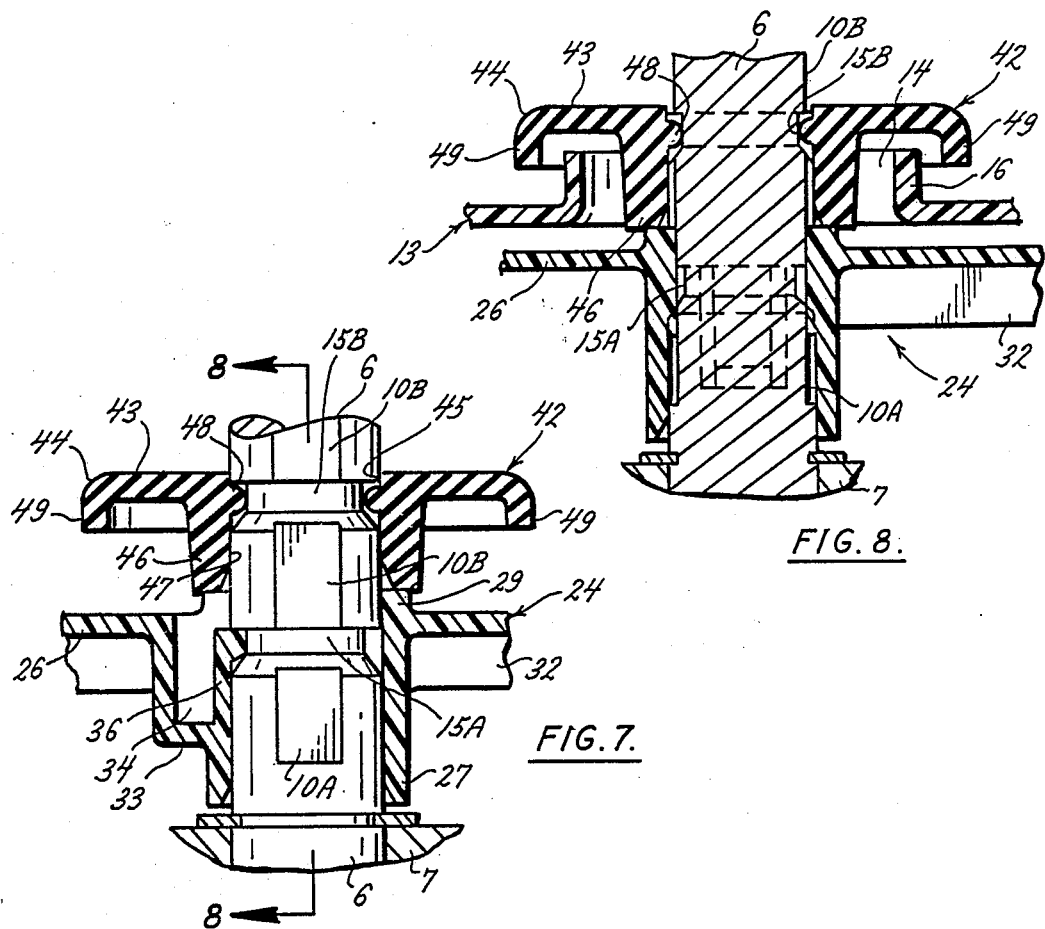
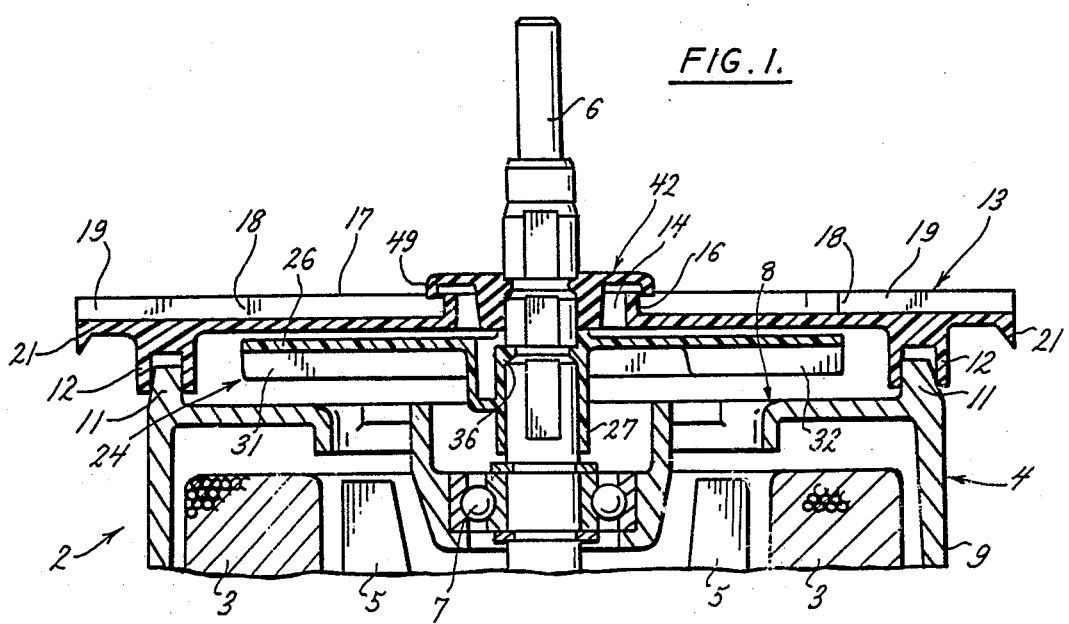

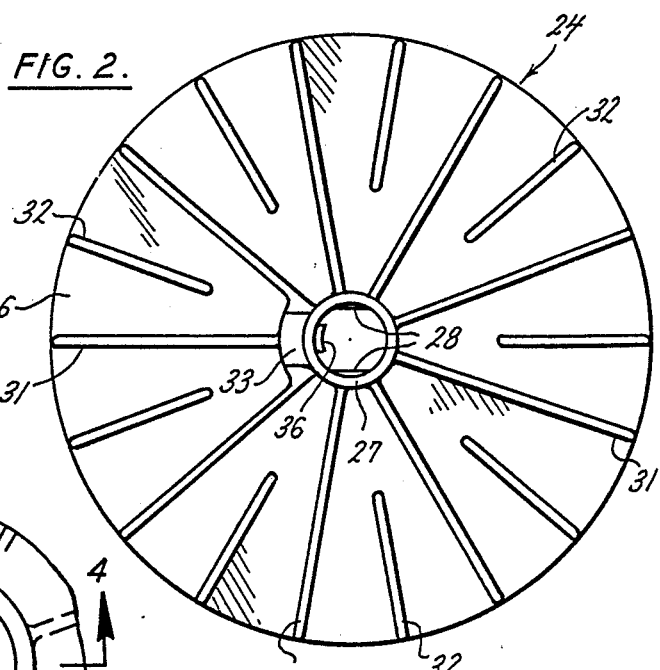
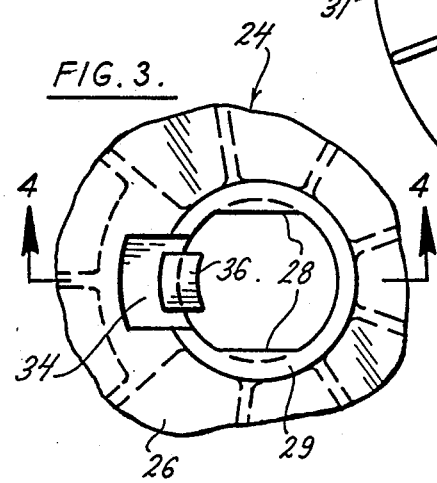
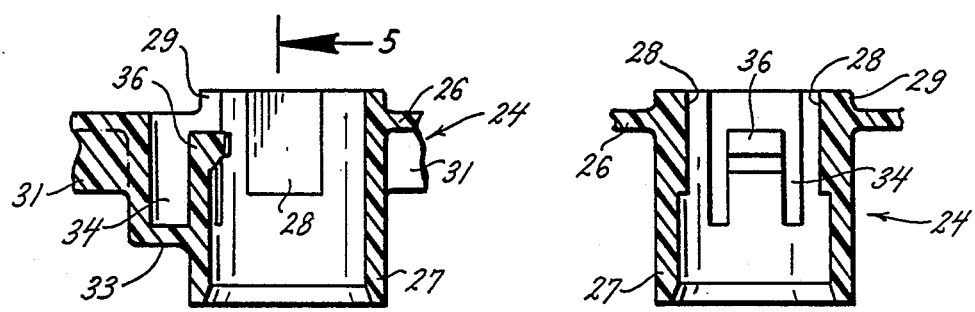
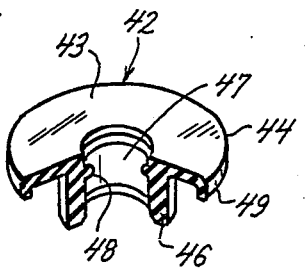

FAN DRIVE WITH WATER SLINGER SEAL

BACKGROUND OF THE INVENTION

This invention relates to a fan drive and water seal for use with an electric motor and more particularly to a fan drive and a water slinging seal for an electric motor mounted vertically in an application such as a dishwasher. While the invention is described in detail with respect to such application, those skilled in the art will recognize the wider application of the invention described hereinafter.

There are many applications commonly known involving the vertical installation of electric motors where the shaft of the motor is utilized in a liquid environment, as for example, in the case of a dishwasher application. In these applications, great care is taken to protect the motor from exposure to water and in particular, to water carrying detergent. In such applications where water carrying detergent has access to the motor either directly as a result of a major seal leak or as a result of casual leakage over a period of time around or through a seal, the destructive effects of the water and detergent on the motor assemblies can be and usually is catastrophic. The hot water combined with the detergent is actively destructive to the coatings used in the windings of the motor and in addition, of course, can wash away the lubricants used at various points in the motor.

In addition to protecting the motor underlying the liquid containing sump, such as that involved in a dishwasher application, there is the additional requirement of cooling the motor while maintaining the integrity of the liquid free environment immediately adjacent to the motor. In addition to the concern for liquid leakage which can be damaging to the motor and the hot air environment in which the motor is operating in a application such as a dishwasher, there is the additional concern for ridding the motor of heat generated within the motor structure itself. An example of a fan external to the motor housing, where the rotor assembly includes vanes to move air from within the rotor cavity of the stator assembly as shown in U.S. Pat. No. 4,689,507 issued to the assignee of the present application, and an additional example of a drain assembly external to the motor used in a dishwasher type application wherein an overlying slinger type seal is utilized on the motor shaft to prevent any liquid or misting from traveling down the shaft and into the motor beyond the drain assembly is shown in U.S. Pat. No. 4,698,511, also issued to the assignee of the present application. In addition to the complexities of the problems of providing both cooling and sealing for motors used in the difficult environment of dishwasher applications, the problems with manufacturability or producibility of the assemblies used to provide the desired operational results and the cost of achieving these results for particular solutions has been quite measurable. The quality of the solution involved in achieving both the desired cooling and the sealing to protect the motor have left much to be desired. Utilizing a fan as a means of cooling is typically difficult because of the limited space available in these types of applications. This is true whether the fan is external or internal to the motor. Earlier versions of fan mechanisms, such as that disclosed in U.S. Pat. No. 4,689,507, have required the use of additional parts or adhesives to secure the fan to a motor shaft. In addition, seals of various types, including those combined with water slingers employed upon the shaft of the motor in an area where the water has access, if not for the slinger seal, have not provided the degree of sealing necessary to assure continuous seal integrity. Because seal integrity is an issue of immediate and paramount concern, both the design of the seal itself and the selection of the material to be used for the seal are critical. The design of the seal and the selection of the appropriate material must yield a result that provides and assures seal integrity over an extended period of time. Specifically a period of time commensurate with the desired life expectancy of the dishwashing machine, as a whole, is the objective where a seal is frequently subjected to the temperature extremes and chemical effects of detergent liquids during the normal course of use.

SUMMARY OF THE INVENTION

It is thus an object of the present invention to provide a fan drive and water seal combination that will work together to permit dishwasher operation without leakage and damage to the motor underlying the liquid sump in an environment in which the motor itself is generating heat and in which heat is being contributed by the washing process in many cases. It is also an object of the present invention to provide a means of retaining the cooling fan on the motor shaft without the use of adhesives or additional and separate parts to hold the fan to the motor shaft. Additionally, it is an object of the present invention to provide positive sealing on the motor shaft above the fan to prevent detergent loaded washwater from leaking on and into the motor. It is yet a further object of the present invention to provide a barrier to detergent loaded washwater liquid, mist, or spray which may otherwise enter the motor and ultimately degrade its performance or cause operational failure. Still another object of the present invention is to provide a fan drive and water seal that is simple, involving no extra or separate parts, is easily producible, and can be easily, quickly, and reliably assembled. Finally it is an object of this invention to provide a high integrity fan drive and slinger seal system for a dishwasher. The present invention addresses all of these objectives by providing an easily manufacturable, inexpensive, and easily installable fan member for positioning in close relationship with the front endshield from which the motor shaft extends which is at the end of the motor facing towards the liquid sump of the dishwasher. The fan member thus positioned is protected by an overlying drip pan which is mounted about the shaft upon which the fan itself is mounted, the drip pan however, being above the fan and itself overlayed on the shaft by a slinger type seal which is mounted on the motor shaft in such a way that it provides a positive and secure, high integrity seal overlaping the drip pan protecting the motor. The seal itself has a central sleeve which fits tightly upon the motor shaft to provide part of the seal effect desired, however, the high integrity aspect of the seal of this invention results from the inclusion within the sleeve of an annular O-ring type seal which snugly engages an annular groove on the shaft.

It should be understood by those skilled in the art after review of and reflection upon the disclosure and the drawings contained herein that the unique slinger seal arrangement and fan drive of the present invention may be varied in material selection and physical presentation to address a variety of specific applications without departing from the scope and spirit of the present invention as disclosed and claimed herein.

BRIEF DESCRIPTION OF THE DRAWINGS

Reference will be made to the following drawings in the course of discussion of the preferred embodiment of the present invention which follows.

In the drawings, FIG. 1 is a cross sectional view of the top front end of a typical dishwasher motor showing the fan drive and overlying water slinger seal of the present invention in place.

FIG. 2 is a top perspective view of the fan drive assembly.

FIG. 3 is a partial bottom view of the shaft engaging mechanism of the fan assembly.

FIG. 4 is a partial sectional view of the fan mounting element taken along line 4—4 of FIG. 3.

FIG. 5 is a partial sectional view of the fan to shaft engagement elements in a view taken along line 5—5 in FIG. 4.

FIG. 6 is a partial sectional perspective view of the water slinger seal revealing the O-ring seal aspect of the invention.

FIG. 7 is a magnified partial sectional view of the motor shaft of the dishwasher motor of FIG. 1 showing the relationship of the fan mount upon the shaft and the overlying slinger seal in relation to the underlying fan assembly and the seal to the motor shaft.

FIG. 8 is a partial sectional view of the present invention relationship to the motor shaft taken along line 8—8 in FIG. 7.

DESCRIPTION OF THE PREFERRED EMBODIMENT

Referring now to the FIG. 1, the front end of a motor 2, which may be an induction type of motor, includes a stator 3 and a front endshield 4. The end shield 4 consists of an end wall 8 and a downward extending side wall 9. The end wall 8 contains a bearing assembly 7 to which the rotor shaft is journaled. A plurality of rotor blades 5 are integrally constructed with a rotor assembly, not shown, to circulate air within the stator 3 at the front end of the motor within endshield 4 in order to provide some degree of internal cooling. Those skilled in the art will recognize that the rotor assembly is commonly journaled at a second end of the motor 2 in a conventional manner.

A liquid drip pan 13 has female socket members 12 which seat upon suitable male standards 11 at the top of the end shield 4 to hold the drip pan in place. A central circular aperture 14 permits the drip pan 13 to be placed over the rotor shaft 6 and then be seated upon the male standards 11.

The drip pan 13 is the first means of protection between the liquid sump of the dishwasher and the underlying electric motor 2. The drip pan 13 has an upwardly extending peripheral side wall 17 which extends around the pan with the exception of opposed drain openings 18 which feed out through the side wall 17 through opposed drain troughs 19. The drain troughs 19 terminate in drain lips 21 which direct water picked up by the drip pan 13 away from the underlying motor. A central circular aperture 14 in the drip pan 13 through which the rotor shaft 6 passes is surrounded by an upwardly extending lip 16. FIG. 1 clearly shows the fan member 24 mounted upon the rotor shaft 6 between the end wall 8 of the endshield 4 and the bottom of the liquid drip pan 13. An overlying slinger ring 43 is shown positioned about the rotor shaft 6 over the fan member 24 and the overlying drip pan 13 so that the downwardly extending peripheral lip 49 overlaps and is juxtaposition with the upwardly extending lip 16 of the drip pan 13, thus keeping liquid from within the drip pan 13 from access to a fan member 24 and the motor 2 below.

Referring now to FIG. 2, fan member 24 includes a disk 26 with a central hub 27 containing internal and opposed flats 28 and an extension finger 36 protruding into the interior of hub 27. A plurality of variable length planar blades, specifically a predetermined number of short blades 32 alternating with a predetermined number of long blades 31 are clearly shown. Blades 31 and 32 are of differing length in order to create a particular and desirable air circulation pattern about the end shield 4 for the purpose of removing air from the apertures in the end wall 8 of the endshield 4. Other fan configurations known to those skilled in the art may be used in this particular application. However, it has been found that the specific configuration of variable size and alternating fan blades on a thin bodied disk as shown is quite efficient in moving the desired amount of air.

FIGS. 3 and 4 more specifically and clearly show the physical characteristics and location of a spring like finger 36 within the hub 27. In FIG. 3 the finger 36 is shown extending into the interior of the hub 27 beyond its interior cylindrical surface. Also shown in FIGS. 3 and 4 are a pair of flats 28 which are diametrically opposed from each other within the interior of hub 27. FIG. 5 shows an edge view of the diametrically opposed flats 28 within the hub 27.

FIG. 4 shows the integrally molded configuration of a finger clip 33 which includes the shaft groove 34 and the axially disposed spring like finger 36. Although the fan member 24 is molded from a semi-rigid, plastic type of material intended to provide the degree of rigidity to the fan member 24 necessary to its air moving function within the confines of the space between the bottom of the drip pan 13 and the endshield 4, without structural interference that could result from flexing by the fan member 24, it is, in fact, this semi-rigid material which permits the finger 36 to flex into the internal hub area and when forced in the opposite direction by action of the shaft 6 pushing radially outward against the finger 36 when introduced axially into the hub 27, to spring back in the opposite direction to engage the shaft groove 34. This flexing action will be explained in more detail hereinafter. Another feature of the hub 27 of the fan member 24 is a hub extension 29 which can be seen in FIGS. 4 and 5. When the fan member 24 is placed upon the rotor shaft 6 as will be seen in FIGS. 7 and 8, the hub extension 29 will be seen to be a resting,, surface for contact by a bottom flat surface slinger seal 42.

The water slinger seal 42 is shown in FIG. 6. The seal 42 consists of a slinger ring 43 which has an outer peripheral curved surface 44 which curves into a downwardly extending lip 49. A central collar member 46 extends downward from a central aperture 47 in the slinger ring 43. Within the central aperture 47 of the collar member 46 an O-ring like seal 48 is disposed. The slinger seal 42 is fabricated from a rubber-like material identifiable as a thermoset rubber or other elastomer having similar sealing properties, which retains its flexibility and resiliency characteristics even after long periods of exposure to the heat and detergent carrying liquids of the dishwasher environment.

The operational assembly of the fan drive of the water slinger seal is shown in FIGS. 7 and 8. In FIG. 7 a series of flats 10A and 10B for each of which there is a diametrically opposed flat on the opposite side of shaft 6, are shown separated axially by annular grooves 15A and 15B. In FIG. 7 it can be seen that the fan member 24 is fitted upon the shaft 6 and, as may be seen in FIG. 8, the flat 28 within the hub 27 of the fan member 24 mates with the diametrically opposed flats 10A on the rotor shaft 6 to lock the fan member 24 from circumferential slippage about the shaft 6 when the motor is operating. The finger 36 as seen in FIG. 7, which is part of the finger clip assembly 33, is shown within the groove 15A on shaft 6 which causes the fan member 24 to be locked axially from movement on the shaft during motor operation. Also, as seen in FIG. 7, the hub extension 29 serves as a contact surface and support for the bottom surface of collar member 46 of the slinger seal 42 when it is placed upon the shaft 6. It can be seen in FIG. 7 that the collar member is not only in contact with the top surface of the hub extension 29, but, in fact, it overhangs the hub extension. This helps to provide the sealing required along the shaft 6 during rotational operation with water, mist, and vapor being immediately present. The central aperture 47 of the slinger seal 42 as seen in FIG. 6 is of a slightly smaller diameter then the diameter of the shaft 6. Thus referring again to FIG. 7, when the slinger seal 42 is placed upon the rotor shaft 6 until the bottom surface of the collar member 46 makes contact with the top surface of the hub extension 49 and the O-ring seal 48 engages the slinger groove 15b and the lip seal contacts the rotor shaft 6 surface, a multiple point and multiple surface seal is created and retained in position axially along the rotor shaft 6 during the rotational motion occurring while the dishwasher is operative. Liquid exclusion from the motor by way of the shaft is thus effectively accomplished.

With reference again to FIG. 1 it can be seen that the downward extending lip 49 of the slinger seal 42 overhangs and is spaced from the upwardly extending lip of the drip pan 13. During operation of the dishwasher, when the rotor shaft is turning, the slinger seal 42 is rotating and any water falling thereon will be thrown outwardly towards and below the top of the upwardly extending side wall 17 of the drip pan 13 as seen in FIG. 1 to prevent such liquid from obtaining access to the motor. The liquid slung is thus captured within the drip pan 13 and eliminated through the drain troughs 19 and drain lips 21, as seen in FIG. 1. The spacing between the downward extending lip 49 and the upwardly extending vertical lip 16 is such that liquid access by way of a meniscus between the two lips and down upon the fan blade 32 and the motor lying below is virtually eliminated. A spacing of 0.187 inches between the opposed faces of the lips 16 and 49 and the edge face of the downward extending lip 49 and the upper face of the overlapped drip pan 13 has been determined to satisfactorily prevent the creation and travel of a liquid meniscus from the drip pan 13 around the slinger seal 42 to contact with the fan 24 and the motor 2 below.

It should thus be clear from the above description and disclosure of the present invention that a simplified and effective means of providing liquid secure fan cooling of the end of the motor in a dishwasher application where the fan is disposed between a drip pan lying above to catch water which might otherwise have access to the motor from the liquid sump above and the seal thereupon provided by the associated slinger seal which provides a multiplicity of sealing surfaces upon the shaft so that liquid travel along the shaft or through the central opening for the motor shaft in the drip pan to the motor lying below is virtually eliminated.

Having thus described the invention, what is claimed and desired to be secured by Letters Patent is:

1. A fan drive with water slinger seal for a vertically mounted electric motor positioned below a liquid sump into which a rotor shaft of the motor extends, comprising;

an electric motor having a front endshield with a central opening through which a rotor shaft passes, said motor being mounted with said rotor shaft vertically disposed, and said rotor shaft having a plurality of pairs of opposed flats extending axially from said front endshield to the end of said shaft;

a means for liquid capture and disposal having a central opening through which said rotor shaft passes in vertical extension from said motor to said liquid sump;

a means for cooling the adjacent end of said motor, said means mounted upon said rotor shaft between said front endshield and said means for liquid capture and disposal; and means having a central opening through which said shaft extends, said means disposed snugly on said shaft for slinging liquids away therefrom and within said means for liquid capture and disposal, and for sealing said shaft to liquid passage when said means snugly presses radially against said shaft and axially upon said means for cooling.

2. The fan drive and water slinger seal of claim 1 wherein said means for cooling the adjacent end of said motor, comprises;

a flat, disk-shaped fan having a centrally located opening;

a cylindrically-shaped and elongated hub extending from one face of said fan about said opening, and a lesser hub extension protruding from the opposite face of said fan in a "C" shape about said opening;

a means disposed within said hub for engaging the annular groove on said rotor shaft adjacent to said motor endshield when said hub is introduced upon said shaft;

a pair of opposed flats located 90° away from said means disposed within said hub for engaging said annular groove on said rotor, said flats disposed to correspond with similarly disposed flats on said rotor shaft when said cooling means is positioned thereon;

a set of long planar blades extending radially from the outer surface of said hub to the outer periphery of said disk, normal to the face from which said hub extends; and a set of short planar blades disposed alternately between every other long blade, said short blades extending radially from an intermediate point between the outer surface of said hub and the outer periphery of said disk, normal to the face from which said hub extends.

3. The fan drive and water slinger seal of claim 2 wherein said means disposed within said hub for engaging said annular groove on said rotor shaft, comprises;

a shaft groove extending radially out from the interior cylindrical surface of said hub and axially along said surface approximately half the length of said hub from the face of said fan having the "C"-shaped hub extension; and a finger clip having a cantilevered, spring-like finger extending upward in said groove axially and having a slight end protrusion extending radially inward near the end of said hub adjacent the face of said fan having the "C"-shaped hub extension.

4. The fan drive and water slinger seal of claim 3 wherein said means for slinging liquids and for sealing said shaft to liquid passage, comprises;
   a washer-shaped ring having a central opening;
   a tubular-shaped hub extending from one face of said ring about said opening, said opening and the interior cylindrical surface of said hub extending from said opening sized for snug adherence about said rotor shaft passing therethrough; and
   an O-ring shaped annular projection about an intermediate level on the interior cylindrical surface of said hub for engagement of the second of said annular grooves on said rotor shaft from said front end shield of said motor.

5. The fan drive and water slinger seal of claim 4 wherein said means for slinging liquids and for sealing said shaft to liquid passage is fabricated from a liquid impervious, high-adherance rubber-like material.

6. The fan drive and water slinger seal of claim 5 wherein said means for liquid capture and disposal, comprises;
   a drip pan having a central opening through which said rotor shaft passes to reach said liquid sump, said drip pan being mounted to and above said front endshield and having an upwardly extending lip about said central opening and an upwardly extending peripheral side wall; and
   a drain means extending laterally outward from said drip pan and sidewalls beyond the outer peripheral limited of said front endshield to dispose of drip pan collected liquid away from said motor.

7. The fan drive and water slinger seal of claim 6 wherein said drain means extending laterally, comprises;
   at least two drain troughs extending from said drip pan through said upwardly extending peripheral wall; and
   drain lips extending from the furthest extremities of said drain troughs to direct captured liquid away from said motor.

8. The fan drive and water slinger seal of claim 7 wherein said washer-shaped ring is spaced from and sized to overlap said opening in said drip pan.

9. The fan drive and water slinger seal of claim 8 wherein said washer-shaped ring is curved downward about its peripheral edge and extends over and is spaced above and about said upwardly extending peripheral lip about said opening in said drip pan to prevent liquid communication from said drip pan and slinger through said central opening in said drip pan to said motor.

10. The fan drive and water slinger seal of claim 9 wherein the spacing between the opposed side faces of said opposed lip surfaces and the spacing between the opposed edge face of the downwardly extending lip and the upper face of said overlapped drip pan is equal to or less than approximately 0.187 inches so that meniscus liquid communication into said drip pan central opening is prevented.

11. A fan drive and water slinger seal for a vertically mounted electric motor positioned below a liquid sump into which a rotor shaft of the motor is connected, comprising;
   an electric motor having an upper endshield surrounding at least some portion of said motor, said endshield having a bearing housing, a bearing retained therein, and one end of a rotor shaft journaled in said bearing and vertically extending through said endshield, said shaft having a plurality of pairs of radially opposed flats extending axially along said shaft in the direction away from said bearing and toward said sump, a radial annular groove between the first of two sets of paired flats and after the second set of said flats;
   a means, having a central opening to accommodate the passage therethrough of said rotor shaft, said opening having a surrounding vertical lip, said means mounted to and above said endshield for capturing and disposing of liquid reaching said means from said sump away from said motor;
   a fan means having a centrally disposed opening surrounded by a cylindrical-shaped hub having a pair of opposed flats within said hub to register with the first set of opposed flats on said shaft from said endshield when said fan means is mounted thereon, said fan means additionally having an integral, spring-like finger extending inward and movable radially from a position axially upon the inner cylindrical surface of said hub to engage said first annular, radial groove on said shaft from said upper endshield, locking said fan means axially upon said shaft; and
   a slinger seal means having a central circular opening surrounded by a collar member having a resilient cylindrical bore, and an O-ring-like annular projection disposed intermediate therein, said bore sealing upon the adjacent cylindrical portions of said rotor shaft, and said O-ring projection sealably engaging the second of said annular grooves upon said shaft passing therethrough, and for slinging liquid leakage from said sump to said liquid capturing and disposing means.

12. A fan drive and water slinger seal for a vertically mounted electric motor positioned below a liquid sump into which a rotor shaft of the motor can be connected, comprising;
   an electric motor having an upper endshield surrounding at least some portion of said motor, said endshield having a bearing housing, a bearing retained therein, and one end of a rotor shaft journaled in said bearing and vertically extending through said endshield, said shaft having a plurality of pairs of radially opposed flats extending axially along and to the end of said shaft in the direction away from said bearing and toward said sump, a radial, annular groove between the first of two sets of paired flats and after the second set of said flats;
   a liquid drip pan mounted to and above said endshield, said drip pan having a central opening to accommodate said rotor shaft passing therethrough and further having an upwardly extending lip about said central opening and an upwardly extending peripheral sidewall;
   a drain means extending laterally outward from said drip pan and sidewalls beyond the outer peripheral limits of said front endshield to dispose of drip pan collected liquid away from said motor;
   a flat, circular, disk-shaped fan having a centrally located opening and, on a face adjacent the end wall of said upper endshield, an integral, centrally disposed hub about said opening, and a plurality of integrally formed blades extending radially outward from said hub, said hub having an extension disposed upon the fan face opposite said upper endshield and further having a generally cylindrical inner surface with a pair of diametrically opposed flats disposed between said hub extension and a point intermediate between the two axial extremes of said hub, and a radially disposed, spring-like finger located axially along and in the direction of said hub extension and extending radially inward beyond said cylindrical inner surface for engaging the first of said annular radial grooves on said shaft from said upper endshield to lock said fan against axial movement when said fan is disposed upon said shaft with said blades facing said upper endshield and the flats of said hub are located in registration with the corresponding flats on said shaft to prevent circumferential slippage between the two; and a flat, disk-shaped, liquid-resistant slinger seal having a slinger ring with a circular opening, peripherally surrounded by an integral collar member extending normal therefrom to snugly fit about said rotor shaft passing therethrough for liquid exclusion from about said shaft, the end of said collar member opposite said slinger ring resting directly upon said hub extension, said sleeve further having an "O"-ring-like, raised annular projection about its interior cylindrical surface to sealably engage the second of said annular radial grooves on said shaft from said upper endshield, said slinger ring spaced from and sized to overlap said upwardly extending lip surrounding said central circular opening in said drip pan, and additionally having a peripheral edge rounded in the direction of said sleeve in spaced, opposed, and overlapping relation with said upward extending lip about said central circular aperture of said drip pan, the spacing between said two overlapping lips being such as to prevent direct, splash, or liquid miniscus passage into said drip pan central circular aperture.

* * * * *

UNITED STATES PATENT AND TRADEMARK OFFICE
CERTIFICATE OF CORRECTION

PATENT NO. : 4,900,957

DATED : February 13, 1990

INVENTOR(S) : Gerald N. Baker and Carl R. Fischer

It is certified that error appears in the above-identified patent and that said Letters Patent is hereby corrected as shown below:

On the title page:
Inventors name is "Gerald N. Barker"
  Should be -- Gerald N. Baker --.

Signed and Sealed this

Twenty-sixth Day of March, 1991

Attest:

HARRY F. MANBECK, JR.

*Attesting Officer*     *Commissioner of Patents and Trademarks*